(12) United States Patent
Abou Mahmoud et al.

(10) Patent No.: US 10,142,280 B2
(45) Date of Patent: *Nov. 27, 2018

(54) SOCIAL CONVERSATION MANAGEMENT

(71) Applicant: INTERNATIONAL BUSINESS MACHINES CORPORATION, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 337 days.

This patent is subject to a terminal disclaimer.

(21) Appl. No.: 15/060,118

(22) Filed: Mar. 3, 2016

(65) Prior Publication Data
US 2016/0301646 A1    Oct. 13, 2016

Related U.S. Application Data

(63) Continuation of application No. 14/680,599, filed on Apr. 7, 2015, now Pat. No. 9,781,067.

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 51/16* (2013.01); *H04L 67/22* (2013.01)

(58) Field of Classification Search
CPC .......... H04L 51/32; H04L 51/16; H04L 67/22
See application file for complete search history.

(56) References Cited

U.S. PATENT DOCUMENTS

| | | | |
|---|---|---|---|
| 7,664,821 B1 | 2/2010 | Ancin et al. | |
| 8,401,009 B1 | 3/2013 | Dorsey et al. | |
| 8,682,723 B2 | 3/2014 | Parsons et al. | |
| 8,694,439 B2 | 4/2014 | Shafique | |
| 8,914,441 B2 * | 12/2014 | Quintuna | G06F 21/604 206/224 |

(Continued)

OTHER PUBLICATIONS

Internation Business Machines Corporation, "Gaining full value from survey text," 2010, IBM Software Business Analytics, 12 pages.

(Continued)

*Primary Examiner* — Moustafa M Meky
(74) *Attorney, Agent, or Firm* — Charles L. Moore; Morre & Van Allen PLLC

(57) ABSTRACT

A method for managing conversations in social media and networks may include selecting, by a processor, a message posted to a social medium for management and associating a goal with the selected message for management. The method may also include monitoring, by the processor, other messages posted to the social medium for messages that are related to the selected message for management. The method may additionally include determining, by the processor, whether the goal has been met based on monitoring the other messages posted to the social network. A first predetermined function is performed in response to the goal being met or a second predetermined function is performed in response to the goal not being met.

13 Claims, 5 Drawing Sheets

(56) References Cited

U.S. PATENT DOCUMENTS

| | | |
|---|---|---|
| 9,143,468 B1 | 9/2015 | Cohen et al. |
| 9,189,567 B1 | 11/2015 | Goldman et al. |
| 2004/0181588 A1 | 9/2004 | Wang et al. |
| 2006/0271526 A1 | 11/2006 | Charnock et al. |
| 2007/0271336 A1 | 11/2007 | Ramaswamy |
| 2011/0055335 A1 | 3/2011 | Reilly et al. |
| 2011/0307403 A1 | 12/2011 | Rostampour et al. |
| 2012/0136936 A1* | 5/2012 | Quintuna .............. G06F 21/604 709/204 |
| 2012/0143972 A1 | 6/2012 | Malik et al. |
| 2012/0148034 A1 | 6/2012 | Ferguson |
| 2012/0158630 A1 | 6/2012 | Zaman et al. |
| 2012/0166532 A1 | 6/2012 | Juan et al. |
| 2012/0290649 A1 | 11/2012 | Ramirez et al. |
| 2013/0054708 A1* | 2/2013 | Bhatt ................... G06Q 10/107 709/206 |
| 2013/0185245 A1 | 7/2013 | Anderson et al. |
| 2013/0254213 A1 | 9/2013 | Cheng et al. |
| 2013/0325993 A1 | 12/2013 | Rao |
| 2014/0012927 A1 | 1/2014 | Gertzfield et al. |
| 2014/0025692 A1 | 1/2014 | Pappas |
| 2014/0032667 A1 | 1/2014 | Wright |
| 2014/0082107 A1 | 3/2014 | Gosling et al. |
| 2014/0142992 A1 | 5/2014 | Nuzzi et al. |
| 2014/0195897 A1 | 7/2014 | Balinsky et al. |
| 2014/0214510 A1 | 7/2014 | Karri et al. |
| 2014/0214529 A1 | 7/2014 | Gross-Baser et al. |
| 2014/0288985 A1 | 9/2014 | Debow et al. |
| 2014/0316872 A1 | 10/2014 | Lee |
| 2014/0379729 A1 | 12/2014 | Savage et al. |
| 2015/0121291 A1 | 4/2015 | Scott et al. |
| 2015/0127748 A1 | 5/2015 | Buryak |
| 2015/0242893 A1* | 8/2015 | Mirchandani .......... G06Q 30/02 705/14.53 |
| 2015/0269155 A1 | 9/2015 | Bastide et al. |
| 2015/0269848 A1 | 9/2015 | Yuen et al. |
| 2015/0310020 A1* | 10/2015 | Brav ................... G06F 17/2785 707/730 |
| 2015/0334072 A1 | 11/2015 | Agarwal et al. |
| 2015/0334073 A1 | 11/2015 | Agarwal et al. |
| 2015/0381555 A1 | 12/2015 | Faller et al. |
| 2016/0140608 A1 | 5/2016 | Gaudet et al. |
| 2016/0212022 A1 | 7/2016 | Abou Mahmoud et al. |
| 2016/0212024 A1 | 7/2016 | Abou Mahmoud et al. |
| 2016/0213994 A1 | 7/2016 | Tilton et al. |
| 2016/0291809 A1 | 10/2016 | Bastide et al. |
| 2016/0291811 A1 | 10/2016 | Bastide et al. |
| 2016/0301651 A1 | 10/2016 | Abou Mahmoud et al. |
| 2017/0011102 A1 | 1/2017 | Goel et al. |

OTHER PUBLICATIONS

Liangjie Hong, Ovidiu Dan, Brian D. Davison, "Predicting Popular Messages in Twitter", Department of Computer Science and Engineering, Lehigh University, WWW 2011, Mar. 28-Apr. 1, 2011, ACM, citeseerx.ist.psu.edu/viewdoc/download, pp. 1 and 2.

Sanebox; "Your Email Without SaneBox," Downloaded from the Internet on Jul. 2, 2015, pp. 1-10 http://www.sanebox.com/l/how-it-works#sthash.hEqocKRM.SmV6aodi.dpbs.

International Business Machines Corporation, "List of IBM Patents or Patent Applications Treated As Related," submitted Feb. 17, 2017, 2 Pages.

International Business Machines Corporation, "List of IBM Patents or Patent Applications Treated As Related," submitted Mar. 3, 2016, 2 Pages.

Cano, A.E., et al.; "Capturing Entity-Based Semantics Emerging from Personal Awareness Streams," 1st Workshop on Making Sense of Microposts, 2011, pp. 33-44.

Sanebox, "Email Overload in the Enterprise: The science behind email productivity," No Publication Date, pp. 1-8.

International Business Machines; "SPSS Text Analytics for Surveys," downloaded from <http://www-03.ibm.com/software/products/en/spss-text-analytics-surveys> on Aug. 12, 2014, pp. 1-2.

International Business Machines; "SPSS Statistics," downloaded from <http://www-01.ibm.com/software/analytics/spss/products/statistics/> on Aug. 12, 2014, pp. 1-2.

Wikipedia; "Natural Language Processing," downloaded from <http://en.wikipedia.org/wiki/Natural_language_processing> on Aug. 12, 2014, pp. 1-11.

Twitter, Inc.; "What are @replies and mentions?" Twitter Help Center, downloaded from <http://support.twitter.com/articles/14023-what-are-replies-and-mentions> on Apr. 6, 2015, p. 1.

Parr, Ben; "Breaking: Facebook Introduces @Mentions in Status Updates," Mashable M, 2009, pp. 1-9.

"Using a Jive Community," No Publication Date, pp. 1-59.

International Business Machines; "SPSS Statistics," downloaded from <http://www-01.ibm.com/software/analytics/spss/products/statistics/> on Apr. 6, 2015, pp. 1-2.

International Business Machines; "Analyzing survey text: a brief overview," IBM Software, Business Analytics, SPSS Text Analytics for Surveys, 2010, pp. 1-12.

Wikipedia; "Mention (blogging)," downloaded from <http://en.wikipedia.org/wiki/Mention_%28blogging%29> on Apr. 6, 2015, pp. 1-3.

\* cited by examiner

SOCIAL CONVERSATION MANAGEMENT

BACKGROUND

Aspects of the present invention relate to social networks, message boards, online mail clients and the like, and more particularly to a method, system and computer program product for managing conversations in social media and networks.

Online social networks are a universal mechanism to connect people and information in logical and organized ways which enable sharing and processing of information between the members of the social network. Common mechanisms for sharing and processing information on online social networks may include, but are not necessarily limited to, a wall or virtual wall or message board where a user or member of the social network can post messages for other users or members; an activity stream which may be a list of messages or posts received by a user or member and may also include a list of messages or posts sent by the user or member; a timeline that may chronologically list a series of events, and profiles of users or members that can be accessed for information about a particular user or member. These mechanisms enable users or members to rapidly share information with others and gather information from others in the network. At times, an exchange of messages or conversation between users may progress in ways which may be considered as being uncontrolled or lacking direction, progressing at a slow pace and in need of acceleration or a boost.

BRIEF SUMMARY

According to one aspect of the present invention, a method for managing conversations in social media and networks may include selecting, by a processor, a message posted to a social medium for management and associating a goal with the selected message for management. The method may also include monitoring, by the processor, other messages posted to the social medium for messages that are related to the selected message for management. The method may additionally include determining, by the processor, whether the goal has been met based on monitoring the other messages posted to the social network. A first predetermined function may be performed in response to the goal being met or a second predetermined function may be performed in response to the goal not being met.

According to another aspect of the present invention, a system for managing conversations in social media and networks may include a processor and a module operating on the processor for managing conversations in a social network. The module may be configured to perform a set of functions that may include selecting a message posted to a social medium for management and associating a goal with the selected message for management. The set of functions may also include monitoring other messages posted to the social medium for messages that are related to the selected message for management. The set of functions may additionally include determining whether the goal has been met based on monitoring the other messages posted to the social medium. A first predetermined function may be performed in response to the goal being met or a second predetermined function may be performed in response to the goal not being met.

According to another aspect of the present invention, a computer program product for managing conversations in social media and networks may include a computer readable storage medium having program instructions embodied therewith, wherein the computer readable storage medium is not a transitory medium per se. The program instructions are executable by a device to cause the device to perform a method that may include selecting a message posted to a social medium for management and associating a goal with the selected message for management. The method may also include monitoring other messages posted to the social medium for messages that are related to the selected message for management. The method may additionally include determining whether the goal has been met based on monitoring the other messages posted to the social medium. A first predetermined function may be performed in response to the goal being met or a second predetermined function may be performed in response to the goal not being met.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
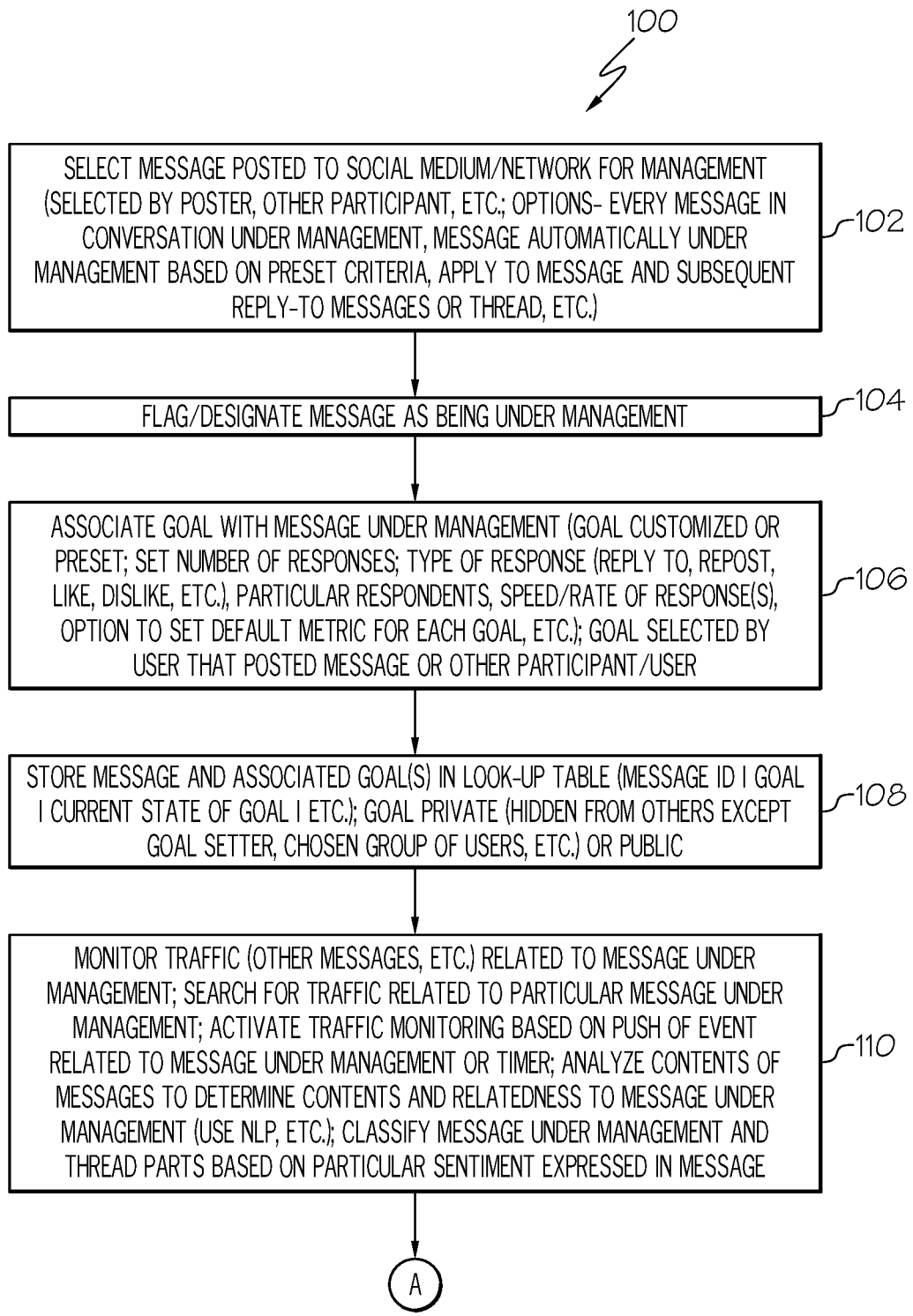
FIGS. 1A-1C (collectively FIG. 1) are a flow chart of an example of a method for conversation management in social media and networks in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1B:
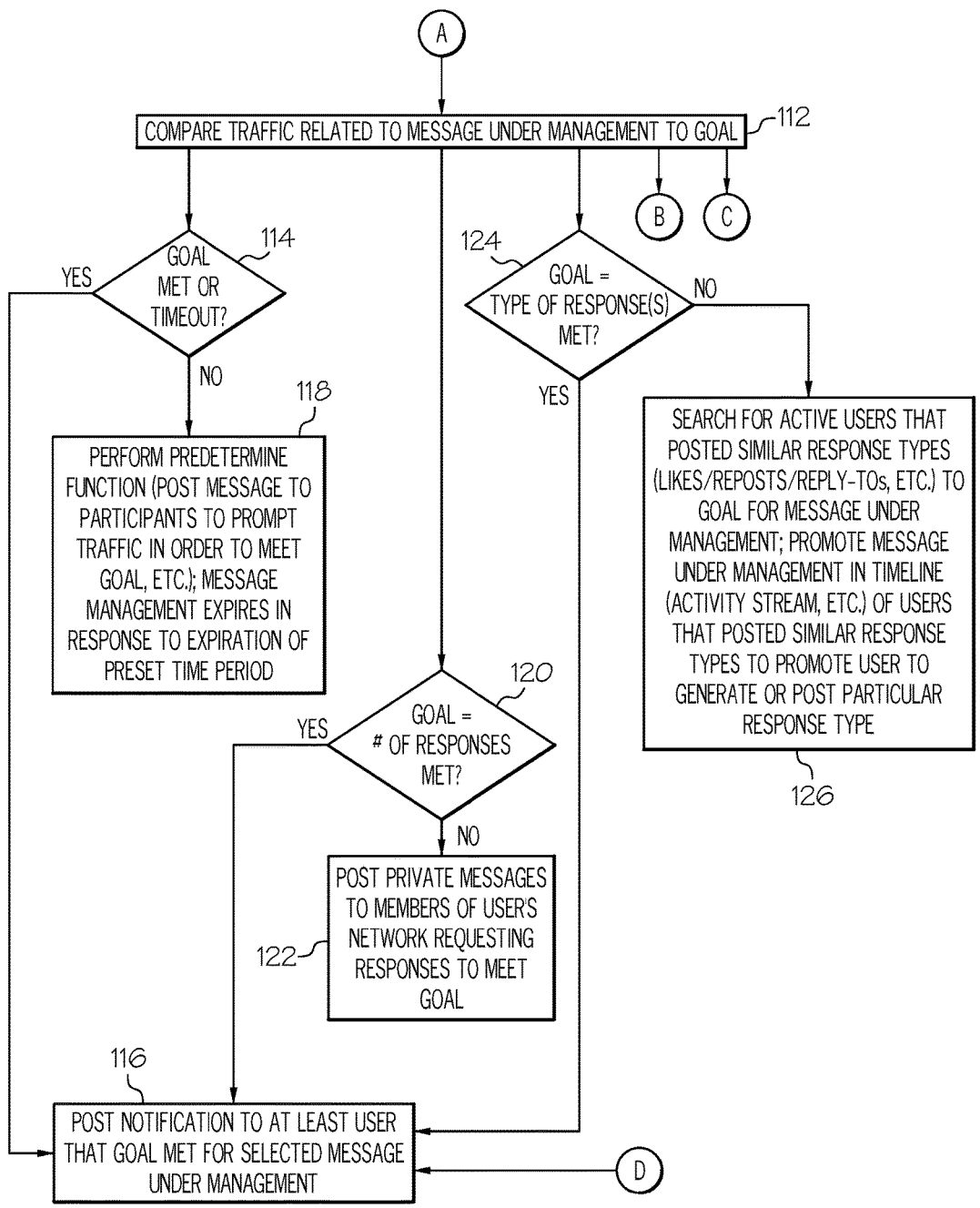
Figure 1C:
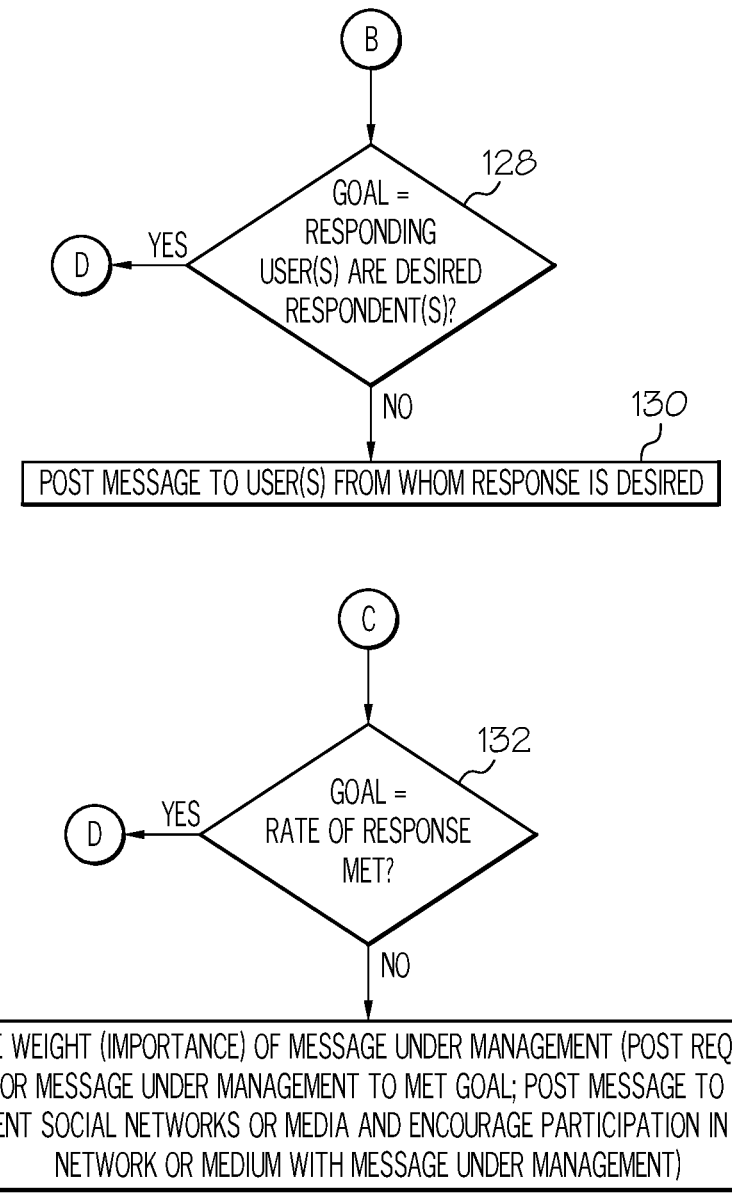

FIGS. 1A-1C (collectively FIG. 1) are a flow chart of an example of a method 100 for conversation management in social media and networks in accordance with an embodiment of the present invention. In block 102, a message posted to a social medium or network may be selected for management. A message selected for management may also be referred to as being under management or may be designated as being under management by a social networking system. The message may be selected by the poster or creator of the message, another participant or user in the social media or network, or the message for management may be selected by some other arrangement, for example, a message may be automatically selected for management or under management in response to a predetermined criteria. An example of a predetermined criterion may be that management is automatically applied to subsequent "reply-to" messages to a first message that is under management or message management may be automatically applied to all messages in a thread. Other predetermined criteria may be that management is applied for specific messages based on the message content, identity of the user posting the message or other characteristic of the message that may be preset for automatically applying social conversation management as described herein. In accordance with an embodiment, an option may also be chosen so that every message in a conversation is under management or just messages that meet certain conditions, such as for example, messages from certain users that may have a particular status in an organization or group.

In block 104, the message selected for management may be flagged or designated as being under management by the social networking system or social conversation management system embodying and performing the method 100 similar to that described herein.

In block 106, a goal may be associated with the message under management. The goal may be a customized goal or a preset goal. Examples of goals that may be associated with a message or messages under management may include but is not necessarily limited to a set number of responses to the message under management; a particular type of response or responses to the message under management; a particular number of a certain type of response; a particular respondent or respondents or desired respondents to the message under management; a preset speed or rate of receipt of responses to the message under management, or any other goal or metric that may be associated with responses to a message under management. The goal may also be used to identify a particular cohort or subset of users to participate in a conversation by setting the goal to limit the conversation to responses from particular identified users, from a specific group of users, or other classification of respondents or users.

Examples of types of responses may include but are not necessarily limited to a "Reply to" response, a repost of the message under management by a recipient, a "like" response, a "dislike" response or other types of responses that may express a particular sentiment, attitude, emotion, group association or other characteristic. Natural Language Processing (NLP) may be used to analyze content of a message to determine a particular sentiment, attitude, emotion or other characteristic.

A metric may be set for a goal. For example a user may set the goal associated with the message under management as a preset number responses of any type of response. Another goal may be a preset number of "like" responses to the message under management. Another example of a metric associated with a goal may be a preset number of responses being posted that are a particular type response. A time period may also be set within which the responses need to be posted or received. A default metric may be set for each goal or type of goal if a metric is needed and not specified. The goal may be selected by the user that posted the message or by another participant or user.

Figures 2, 3:
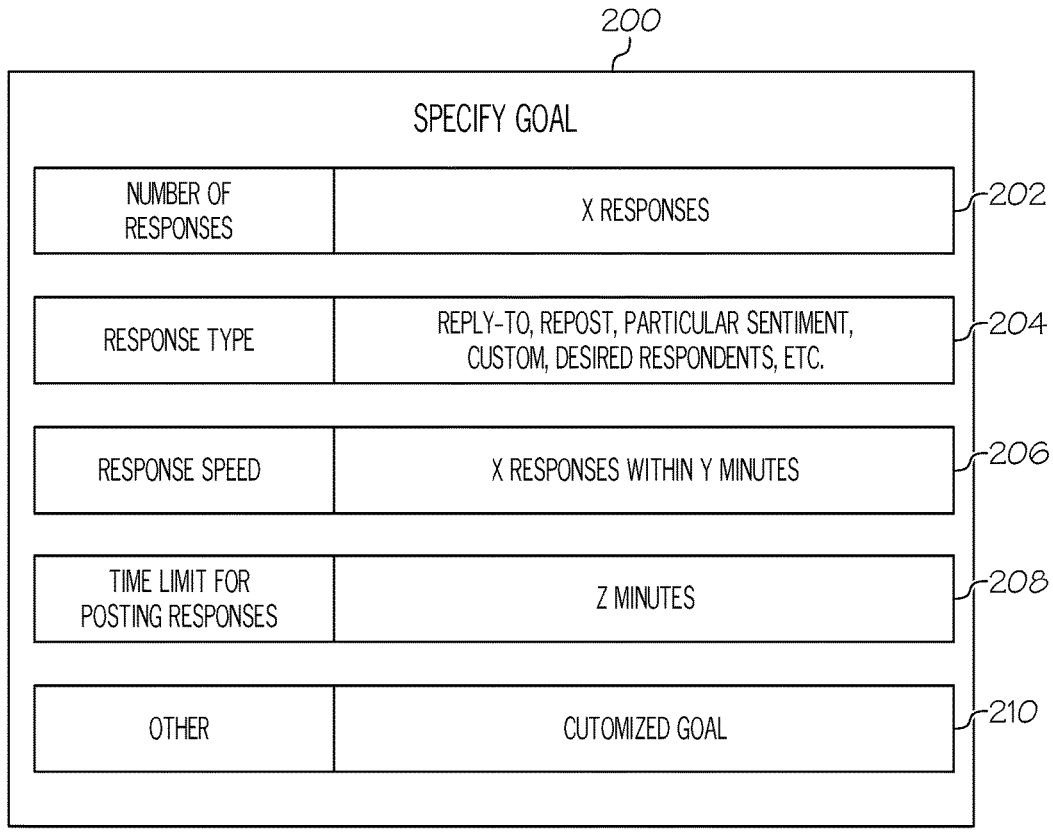
FIG. 2 is an example of a graphical user interface for specifying or defining a goal for associating with a posted message under management in accordance with an embodiment of the present invention.
FIG. 3 is an example of a goal lookup table in accordance with an embodiment of the present invention.

A graphical user interface (GUI) or other tool provided by the social conversation management method 100 or system may be used for specifying or defining a goal associated with a message selected for management. Referring also to FIG. 2, FIG. 2 is an example of a graphical user interface 200 or tool for specifying or defining a goal for association with a posted message under management in accordance with an embodiment of the present invention. The exemplary GUI 200 may include a feature 202 for entering a number of responses required to meet the goal and a feature 204 for entering or selecting a particular type of response from a plurality of different types of responses for the goal. Similar to that previously described, the types of responses may include but are not necessarily limited to a "Reply-to" response, a repost response, a response that expresses a particular sentiment based on NLP or other language processing of the response, responses from a particular desired respondent or respondents or other characteristic defining a certain type of response. The GUI 200 may also include a feature 206 for specifying a speed of responses and a feature 208 for specifying a time limit within which any responses need to be posted to meet the goal. The GUI 200 may also include any other features 210 for generating a customized goal.

In block 108, the messages under management and associated goals may be stored in a look-up table. Referring also to FIG. 3, FIG. 3 is an example of a lookup table 300 in accordance with an embodiment of the present invention. The lookup table 300 may include a first column or "MESSAGE ID" column 302 and may include cells for inserting an identification of each message under management. The lookup table 300 may also include a second column or "GOAL" column 304 and may include cells for inserting the goal or goals associated with each message under management in the MESSAGE ID column 302. The lookup table 300 may additionally include a third column or "CURRENT STATE OF MEETING GOAL" column 306 that may include cells for indicating a state or status toward meeting the goal in the GOAL column 304, for example, a number of responses that have be received or posted toward meeting the goal, a number of a particular type of response that have been received or posted toward meeting the goal in the GOAL column 304, or other status toward meeting the goal.

In block 110, traffic, including new messages or posts to the social medium or network, may be monitored for messages or posts related to the message under management. As responses are created on the social medium or network, server side code (or client side code) may send the response to an analysis routine or module configured to determine if the newly created or posted message is under management and/or related to the message under management or another message under management. The analysis routine or module may include Natural Language Processing (NLP) or other language processing. A search of the social media or network may be performed to find traffic or messages related to the particular message under management. Traffic monitoring may be activated based on a push event related to the message under management. The traffic may also be monitored based upon a timer so that only messages or posts within a certain time period following posting of the message under management are considered or monitored. Contents of the traffic or each message may be analyzed to determine if the content of each message is related to the message under management. NLP or other processing may be performed to analyze the content of each message in the monitored traffic. Message components, such as N-grams, may be evaluated based on similarity to the message under management. The message under management and thread parts of the conversation may be classified based on a particular sentiment expressed in the message.

In block 112 (FIG. 1B), each message that is determined to be related to the message under management may be compared to the goal to determine if the message contributes to meeting goal based on the comparison.

In block 114, a determination may be made if the goal has been met or a preset time period expired. If the goal has been met the method 100 may advance to block 116. In block 116, a first predetermined function may be performed in response to the goal being met. For example, a notification may be posted to at least the user that the goal has been met for the selected message under management. The message may also be removed from management in response to the goal being met.

If the goal has not been met or preset time period expired in block 114, the method 100 may advance to block 118. In block 118, a second predetermined function may be performed in response to the goal not being met. For example, a message may be posted to participants of the social network to prompt the participants to generate responses or traffic for meeting the goal. A preset time period for the message to be under management may set and the message will no longer be under management in response to the preset time period expiring. The preset time period may be set by default or may be set by a user or other administrator.

In block 120, if the goal is a preset number of responses and the goal has been met, the method 100 may advance to block 116 similar to that previously described. If the goal has not been met in block 120 or preset time period for message management has timed out, the method 100 may advance to block 122. In block 122, private messages may be posted to members of the user's network requesting responses to meet the goal.

In block 124, if the goal is a particular type of response or number of responses of a particular type and the goal has been met, the method 100 may advance to block 116 and the method 100 may proceed similar to that previously described. If the goal has not been met in block 124 preset time period for message management has timed out, the method 100 may advance to block 126. In block 126, a search for active users that posted a similar type of response to the type of response specified in the goal may be performed. The message under management may be promoted in a timeline or activity stream of the active users found in the search that posted the similar response type to the response type of the goal in order to prompt these users to generate a response of the particular type for meeting the goal.

In block 128 (FIG. 1C), if the goal is that the responding user or social network participant or participants are a desired respondent or respondents and the goal has been met, the method 100 may advance to block 116 similar to that previously described. If the goal has not been met in block 128 or message management timed out, the method 100 may advance to block 130. In block 130, a message may be posted to the users or social network participants from whom a response is desired to meet the goal.

In block 132, if the goal is a particular rate of response and the goal has been met, the method 100 may advance to block 116 (FIG. 1B) similar to that previously described. If the goal has not been met or message management timed out in block 132, the method 100 may advance to block 134. In block 134, the weight or importance of a message under management may be increased in the social medium or network to encourage a rate of response that may meet the goal. The requirement needed for the message under management to meet the goal may be posted. Messages may also be posted to users or participants in other media or social networks to encourage participation in the social network with the message that is under management.

The method 100 or system implementing the method 100 may be applicable to any online social network including asymmetric or I follow social networks or media such as Twitter® and symmetric social networks or I connect social networks such a Facebook®, Connections or other social networks where member may be connected for communications in both directions. Twitter® is a trademark of Twitter, Inc. in the United States, other countries or both. Facebook® is a trademark of Facebook, Inc. in the United States, other countries or both. Connections is a trademark of International Business Machines Corporation in the United States, other countries or both.

The method 100 or system implementing the method 100 may be used in marketing or seeding by driving the importance of a posted message under management so that a desired marketing message is raised in importance via the responses. For example, a message or item reposted on social media, such as Facebook, may be considered of more importance than a message or item which has no responses.

The method 100 or system implementing the method 100 may also implement or incorporate a monetization system. For example, a fee structure or system may be implemented for use of the message management feature.

In accordance with an exemplary embodiment of the invention as described with respect to the method 100 of FIGS. 1A-1C, user A and user B may be members of an online social network and may be connected online. User A may post a message, for example, "Anyone watching television show CDE?" The message may be flagged by user A using a graphical user interface (GUI) or other tool associated with the social conversation management system on the user's computing device as "under management" and a goal may be associated with the message. As an example, the goal may be number of responses equal 2. The posted message may be detected by the method 100 or system as being under management and monitor for responses to the posted message. After a preset period of time, if the goal has not been met as in block 114 or block 120 (FIG. 1B), the system or method 100 may determine that the number of responses is less than the number of desired responses. A message may be transmitted or posted to user B that there is a new message that may be of interest to user B to prompt user B to post a response. This function of posting a message to prompt responses to the message under management may be referred to as seeding.

In accordance with another embodiment, user C and user D may be members of an online social network and may be connected online. User C may post a message, such as "Anyone watching television show ABC?" The message may be flagged by user C using a GUI or other tool associated with the social conversation management system on the user's computing device as "under management" and a goal may be associated with the message. The goal may specify that the type of response or responses wanted are "Reply-to" responses and the number of "Reply-to" responses may be set to equal 2. The system detects the posted message as being under management and monitors for responses to the posted message. In this example, user D posts a "likes" response to the posted message under management. The system or method determines that the response does not meet the "Reply-to" response specified in the goal. After a preset time period without any "Reply-to" responses being posted or received, the system or method determines that the number of "Reply-to" responses is less than the number of responses set in the goal. A message may be posted or transmitted to user D and other users in response to the goal not being met to prompt user D and other users to respond with a post that may contribute to meeting the goal. This is an example of mixing in new conversation members.

In accordance with another embodiment, user A and user B may be members of an online social network and may be connected online. User A may post a message "anyone watching the television show ABC?" User A may flag the posted message as being under management and associate a goal with the posted message using a GUI or other tool of the social conversation management method or system. In this example, the goal may be set as the type of response being positive. Similar to that previously described, the system or method may detect that the posted message is under management and may begin monitoring for responses that are related to the message. User B may reply, "The show is boring." The system may use NLP or other language processing technology to determine that the response does not contribute to meeting the goal associated with the posted message under management. The message from user B may then be filtered from the subsequent conversation. This is an example of the social conversation management system or method filtering out responses that do not contribute to meeting the goal associated with the posted message under management.

Figure 4:
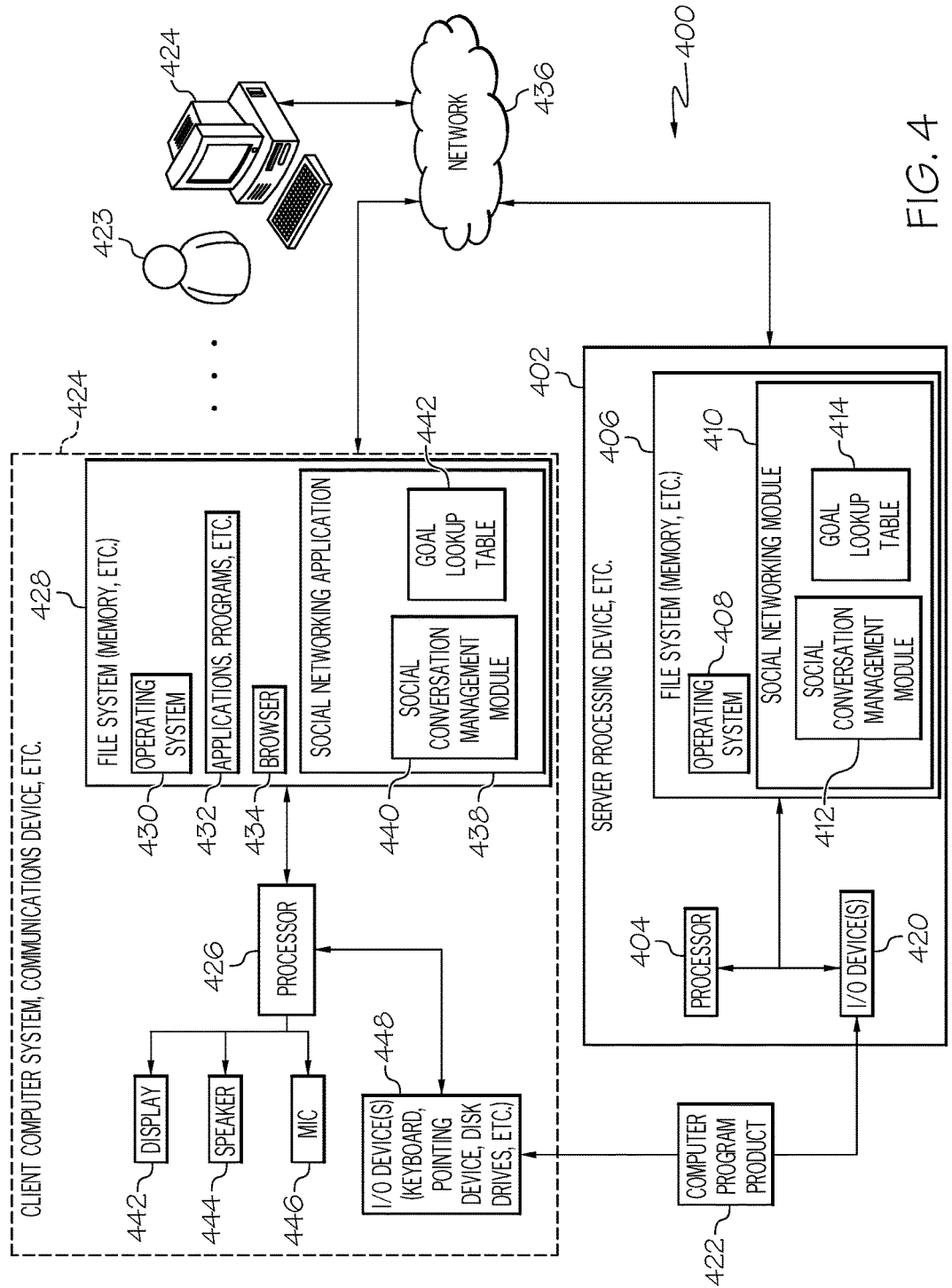
FIG. 4 is a block schematic diagram of an example of a system for conversation management in social media and networks in accordance with an embodiment of the present invention.

FIG. 4 is a block schematic diagram of an example of a system 400 for conversation management in social media and networks in accordance with an embodiment of the present invention. The method 100 of FIGS. 1A-1C may be embodied in and performed by the system 400. The system 400 may include a processing device 402. The processing device 402 may be a server or similar processing device. The processing device 402 may include a processor 404 for controlling operation of the processing device 402 and for performing functions, such as those described herein with respect to conversation management. The processing device 402 may also include a file system 406 or memory. An operating system 408, applications and other programs may be stored on the file system 406 for running or operating on the processor 404. A social networking module 410 or system may also be stored on the file system 406 and may be compiled and run on the processor 404 to perform the functions for conducting online communications or activity streams between users similar to that described herein. The social networking module 410 may be any type of online communications mechanism for online communications or conversations. The method 100 of FIGS. 1A-1C may be embodied in the social networking module 410 and performed by the processor 404 when the social networking module 410 is compiled and run on the processor 404.

The social networking module 410 may include a social conversation management module 412 or system. The social networking module 410 may be configured to perform functions similar to those described with reference to the method 100 in FIGS. 1A-1C.

The social networking module 410 may also include a goal lookup table 414. The goal lookup table 414 may be similar to the goal lookup table 200 described with reference to FIG. 2. The goal lookup table 414 is shown in the exemplary embodiment of FIG. 4 as a separate component from the social conversation management module 412; however the goal lookup table 414 may also be part of the social conversation management module 412.

The social conversation management module 412 and goal lookup table 414, while shown in the exemplary embodiment of FIG. 4 as components of the social networking module 410, the social conversation management module 412 and lookup table 414 may each be a separate component from the social networking module 410 in another embodiment.

The processing device 402 may also include one or more input devices, output devices or combination input/output devices, collectively I/O devices 420. The I/O devices 420 may include, but are not necessarily limited to, a keyboard or keypad, pointing device, such as a mouse, disk drive and any other devices to permit a user to interface with and control operation of the processing device 402 and to access the social networking module 410 or system. At least one of the I/O devices 420 may be a device to read a computer program product, such as computer program product 422. The computer program product 422 may be similar to that described in more detail herein. The social networking module 410 may be loaded on the file system 406 from a computer program product, such as computer program product 422.

A member of a social network or user 423 of the system 400 for social networking may use a computer system 424 or communications device to access the processing device 402 or server and social networking module 410 or system. The computer system 424 or communications device may be any sort of communications device including a mobile or handheld computer or communications device. The computer system 424 may include a processor 426 to control operation of the computer system 424 and a file system 428, memory or similar data storage device. An operating system 430, applications 432 and other programs may be stored on the file system 428 for running or operating on the processor 426. A web or Internet browser 434 may also be stored on the file system 428 for accessing the processing device 402 or server via a network 436. The network 436 may be the Internet, an intranet or other private or proprietary network.

In accordance with an embodiment, a social networking application 438, feature or module may also be stored on the file system 428 and operate on the processor 426 of the user's computer system 424. The social networking application 438 may be any sort of online communications mechanism, such as a social networking or social media application, electronic mail client or email application, or other application for online communications or conversations capable of performing the functions and operations described herein. The social networking application 438 may include a social conversation management module 440 similar to that described herein. In another embodiment, the social conversation management module 440 may be a separate module from the social networking application 438 and operate in cooperation with the social networking application 438 to perform the functions described herein.

The social networking application 438 may also include a goal lookup table 442. In another embodiment, the goal lookup table 442 may be part of the social conversation management application 440 or a separate element. The social networking application 438 operating on the computer system 424 may interface with or operate in conjunction with the social networking module 410 or system on the processing device 402 or server to perform the functions and operations described herein for conversation management in a social network. Accordingly, social networking application 438 operating on the computer system 424 may perform some of the functions and operations of the method 100 and social networking module 410 operating on the server 402 may perform other functions of the method 100. Some embodiments of the present invention may include only the social networking module 410 and social conversation management module 412 on the processing device 402 or server, and other embodiments may include only the social networking application 838 and module 440 on the client computer system 424 or communications device.

The computer system 424 may also include a display 442, a speaker system 444, and a microphone 446 for voice communications. One or more user interfaces may be presented on the display 442 for controlling operating the social networking module 410 and social networking application 438 and for performing the operations and functions described herein.

The computer system 424 may also include one or more input devices, output devices or combination input/output devices, collectively I/O devices 448. The I/O devices 448 may include a keyboard or keypad, pointing device, such as a mouse, disk drives and any other devices to permit a user, such as user 423, to interface with and control operation of the computer system 424 and to access the social networking application 438 and social networking module or system 410 on server 402. The I/O devices 448 may also include at least one device configured to read computer code from a computer program product, such as computer program product 422.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for managing conversations in social media and networks, comprising:
    selecting, by a processor, a message posted to a social medium for management;
    associating, by the processor, a goal with the selected message for management;
    monitoring, by the processor, other messages posted to the social medium for messages that are related to the selected message for management;
    storing, by the processor, an identification of the selected message under management, the associated goal and a current state of the associated goal, wherein the identification of the selected message for management, the associated goal and the current state of the associated goal are stored in a lookup table;
    determining, by the processor, whether the goal has been met based on monitoring the other messages posted to the social medium; and
    performing, by the processor, one of: a first predetermined function in response to the goal being met and a second predetermined function in response to the goal not being met.

2. The method of claim 1, further comprising designating the selected message for management as being under management in response to the message being selected for management.

3. The method of claim 2, wherein selecting the message posted to the social medium for management comprises every message in a conversation being under management.

4. The method of claim 1, wherein selecting the message for management comprises automatically designating a particular message as being under management in response to a preset criteria.

5. The method of claim 4, wherein the preset criteria comprises the particular message being a subsequent reply-to message to a first message under management.

6. The method of claim 1, further comprising analyzing content of each new message posted to the social medium to determine relatedness to the selected message for management.

7. The method of claim 6, further comprising:
    comparing a new message related to the message for management to the goal; and
    determining if the new message contributes to meeting the goal based on the comparison.

8. The method of claim 1, wherein performing the second predetermined function in response to the goal not being met comprises transmitting a message to at least one other participant in the social medium that prompts the at least one other participant to post a response that contributes to meeting the goal.

9. The method of claim 1, wherein the goal comprises a set number of responses, the method further comprising posting a new message that prompts a group of responses to the selected message in order to meet the goal in response to the goal not being met.

10. The method of claim 1, wherein the goal comprises a particular number and type of responses, the method further comprising:
    searching active users for users that posted a similar type response to a type response for meeting the goal in response to the goal not being met; and
    promoting the selected message for management in a timeline of each active user that posted the similar type of response to the type of response for meeting the goal.

11. The method of claim 1, wherein the goal comprises receiving a response from a desired respondent, the method further comprising posting a new message to the desired respondent in response to the goal not being met.

12. The method of claim 1, wherein the goal comprises a preset rate of response, the method further comprising increasing a weight of importance of the selected message for management to prompt additional responses to meet the goal.

13. The method of claim 1, wherein monitoring other messages posted to the social medium comprises monitoring the other messages based upon a timer so that only messages posted within a certain time period following posting of the selected message for management are monitored.

* * * * *